United States Patent [19]
Wong et al.

[11] Patent Number: 5,783,246
[45] Date of Patent: Jul. 21, 1998

[54] PREPARATION OF COFFEE PRODUCTS WITH IMPROVED PARTICLE PACKING CHARACTERISTICS

[75] Inventors: Vincent Y. L. Wong, Hamilton; Leonard E. Small, Cincinnati; Richard J. Sackenheim, Hamilton, all of Ohio

[73] Assignee: The Procter & Gamble Company, Cincinnati, Ohio

[21] Appl. No.: 660,471

[22] Filed: Jun. 7, 1996

Related U.S. Application Data

[63] Continuation of Ser. No. 439,928, May 12, 1995, abandoned, which is a continuation of Ser. No. 92,738, Jul. 16, 1993, abandoned.

[51] Int. Cl.⁶ .................. A23F 5/00; A23F 5/10
[52] U.S. Cl. .............. 426/594; 426/388; 426/454; 426/595
[58] Field of Search .................. 426/394, 388, 426/454, 595

[56] References Cited

U.S. PATENT DOCUMENTS

| | | |
|---|---|---|
| 3,652,293 | 3/1972 | Lombana et al. |
| 3,769,031 | 10/1973 | McSwiggin ............... 426/148 |
| 4,254,694 | 3/1981 | Illy . |
| 4,594,256 | 6/1986 | Zemelman et al. ............ 426/594 |
| 4,637,935 | 1/1987 | Kirkpatrick et al. ........... 426/443 |
| 4,858,522 | 8/1989 | Castelli ..................... 99/280 |
| 5,227,188 | 7/1993 | Leppla et al. ............... 426/595 |

FOREIGN PATENT DOCUMENTS

| | | |
|---|---|---|
| 0010810 | 7/1983 | European Pat. Off. . |
| 1273040 | 5/1972 | United Kingdom . |

OTHER PUBLICATIONS

N. Standish, A. Yu, *Porosity Calculations of Ternary Mixtures of Particles*, 49 Powder Technology pp. 249–253 (1987).

F. P. Hall, H. Insley, *Phase Diagrams for Ceramists*, pp. 9–10 (1947).

Primary Examiner—Anthony J. Weier
Attorney, Agent, or Firm—Eric W. Guttag; Daniel F. Nesbitt

[57] ABSTRACT

Included is the preparation of particulate coffee products with improved particle packing characteristics. Fine coffee particles having particle diameters of less than about 600 micrometers are compacted to a bulk density of from about 0.40 to about 0.70 gm/cc. The resulting coffee products have the isodensity and isobrew solid profiles as shown in FIGS. 1 and 2, respectively, where the bulk density and brew solid values for any ternary particle mixture represented on the graph increases with increased coffee fine fractions therein. The process can also be used to control or increase the bulk density of particulate coffee products thereby eliminating or reducing the need to rely upon roasting means to control bulk density. The compaction operation changes the particle morphology without rupturing the cell walls of the coffee.

12 Claims, 11 Drawing Sheets

PREPARATION OF COFFEE PRODUCTS WITH IMPROVED PARTICLE PACKING CHARACTERISTICS

This is a continuation of application Ser. No. 08/439,928, filed on May 12, 1995, now abandoned, which is a continuation of application Ser. No. 08/092,738, filed on Jul. 16, 1993, now abandoned.

FIELD OF THE INVENTION

This invention relates to the preparation of particulate coffee products with improved particle packing characteristics.

BACKGROUND OF THE INVENTION

Roast and ground coffees products are often categorized in terms of bulk densities, e.g., low or high density coffee. Low density coffees are often less costly to manufacture since less coffee by weight is needed to fill a standard coffee can. By contrast, high density coffees are often more expensive and are marketed as "traditional" coffees with "slow roasted flavor and aroma."

Historically, coffee bulk density (e.g., tamped bulk density) has been controlled primarily by the rate and degree of green bean roasting. For example, higher bulk densities can be reached by allowing coffee beans to roast to darker colors or by subjecting the beans to longer roasting times. Conversely, lower bulk densities can be obtained by roasting the beans to lighter roast colors or by subjecting the beans to faster roast times.

However, controlling bulk density by controlling roasting can produce undesirable or compromised results. Optimum green bean roasting conditions for flavor and aroma development often do not correlate with optimum roasting conditions to reach a particular target bulk density. To obtain a high density coffee, for example, darker roast colors are targeted but dark roasted beans often have an overdeveloped or burnt flavor. Slower roast times can be used but this tends to increase manufacturing costs.

One method of controlling bulk density by non-roasting means is disclosed in U.S. Pat. No. 5,227,188 to Leppla et al., assigned to The Procter & Gamble Company, issued Jul. 13, 1993. The disclosed method involves admixing and compacting larger and smaller diameter coffee particles together in critical weight ratios. The smaller particles fit more tightly between the larger particles thus increasing the bulk density. The admixing and compaction steps in the patented process can be varied to the extent necessary to obtain a particular target bulk density.

There is a continuing need to provide additional processes for controlling bulk density by non-roasting means. It is therefore an object of this invention to provide such a process by altering the particle morphology of fine coffee particles via compaction forces, thus improving their particle packing characteristics. It is a further object of this invention to provide a particulate coffee product that exhibits unique and improved particle packing characteristics.

SUMMARY OF THE INVENTION

In its process aspects, the present invention relates to a process for making particulate coffee products with improved particle packing characteristics. In a first step of the process, fine coffee particles are obtained which have particle diameters of less than about 600 micrometers. In a second step, the fine particles are subjected to compaction forces. During compaction, the bulk density is increased by at least about 0.05 gm/cc to between about 0.40 and about 0.70 gm/cc. These fine coffee particles pack more efficiently in particulate coffee products. These compacted particles can be mixed with other coffee products such as roast and ground coffee as a means of increasing or controlling bulk density.

In its product aspects, the present invention comprises fine coffee particles having average particle diameters of less than about 600 micrometers and a compacted bulk density of between about 0.40 and about 0.70 gm/cc. The product is further characterized in terms of its unique isodensity and isobrew solid profiles as shown in FIGS. 1 and 2, respectively, where both brew solids and bulk density increase with increased percentages of compacted fines therein.

BRIEF DESCRIPTION OF THE DRAWINGS

All Figures herein are ternary graphs. Such graphs are described generally by F. P. Hall and H. Insley, Phase Diagrams for Ceramists, pg. 9–10 (1947), which is incorporated herein by reference. Each ternary axes represents a coffee particle fraction (based on particle size) of a ternary particle mixture. The three particle fractions represented on the graphs are 1) on—20 mesh U.S. Standard Sieve Screen fraction, 2) through—20 and on—30 mesh U.S. Standard Sieve Screen fraction, and 3) through—30 mesh U.S. Standard Sieve Screen fraction (referred to herein as "coffee fines"). On the graphs, point "A" represents a particle mixture comprising 100% on—20 mesh particles, point "B" represents a particle mixture comprising 100% through—20 mesh and on—30 mesh particles, and point "C" represents a particle mixture comprising 100% through—30 mesh particles. Within the ternary axes are isodensity contour lines mapping out regions of constant bulk densities.

FIGS. 1 and 2 are isodensity and isobrew solid ternary graphs, respectively. These graphs define the isodensity and isobrew solid profiles of the coffee product herein.

FIG. 8 is an isobrew solid ternary graph for the coffee product used to generate the FIG. 7 isodensity ternary graph.

DETAILED DESCRIPTION OF THE INVENTION

Preparation of the coffee products herein involves compaction of coffee fines to alter their particle morphology. The altered fines have improved particle packing characteristics, e.g., the particles fit more efficiently among themselves and among other coffee particles while also maintaining flowability. These altered fines are preferably admixed with other particulate coffee products as a means of increasing or controlling bulk density of the coffee mixture. The coffee product of the present invention can be characterized in terms of its isodensity and isobrew solid profiles. These profiles are shown in the isodensity and isobrew solid ternary graphs in FIGS. 1 and 2.

As used herein, all coffee materials and products, including solid coffee extracts, are in particulate form and are derived from roasted green coffee beans unless otherwise specified.

As used herein, the term "density" means bulk density. Density or bulk density values herein can be measured by conventional means as tamped bulk density values.

As used herein, "brew solid values" refer to brew solids obtained from 10 cups of coffee brewed from 19.2 grams of a roasted coffee product on an automatic drip coffee maker.

All particle screens referred to herein are based on the U.S. Standard Sieve Screen Series.

As used herein, "compacted fines" means coffee material having an average particle diameter of less than about 600 micrometers, a bulk density of between about 0.40 and about 0.70 gm/cc, and which has been subjected to a compaction process such that the morphology of the particles is changed.

As used herein, "isodensity" means the bulk density contour lines on the ternary graphs in FIGS. 1, 3–7 and 9–11 which map out regions of constant bulk density values.

Figure 2:
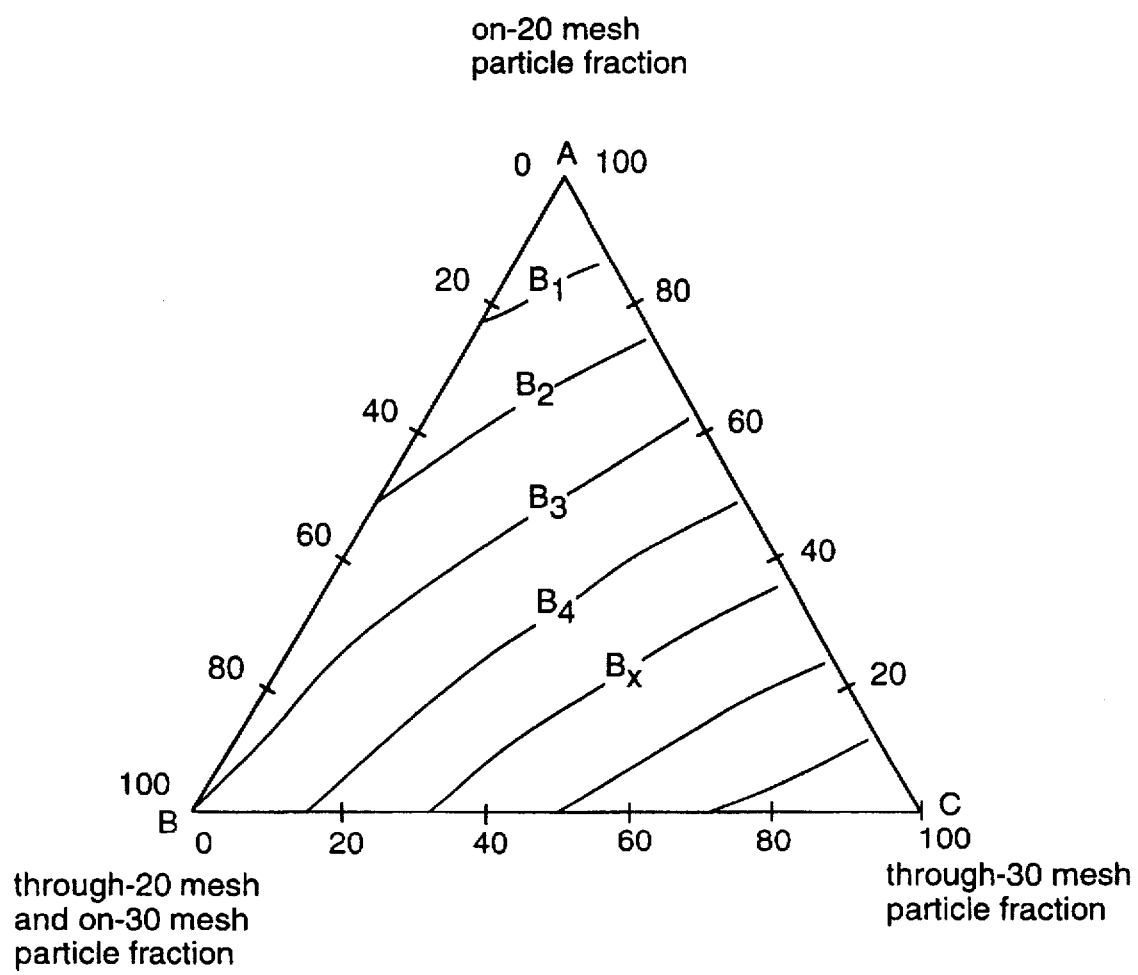
In FIGS. 2 and 8, isodensity lines are replaced by isobrew solid lines. The ternary particle mixture from which each graph was generated is represented by a single emphasized point (●) on each graph.
Figure 8:
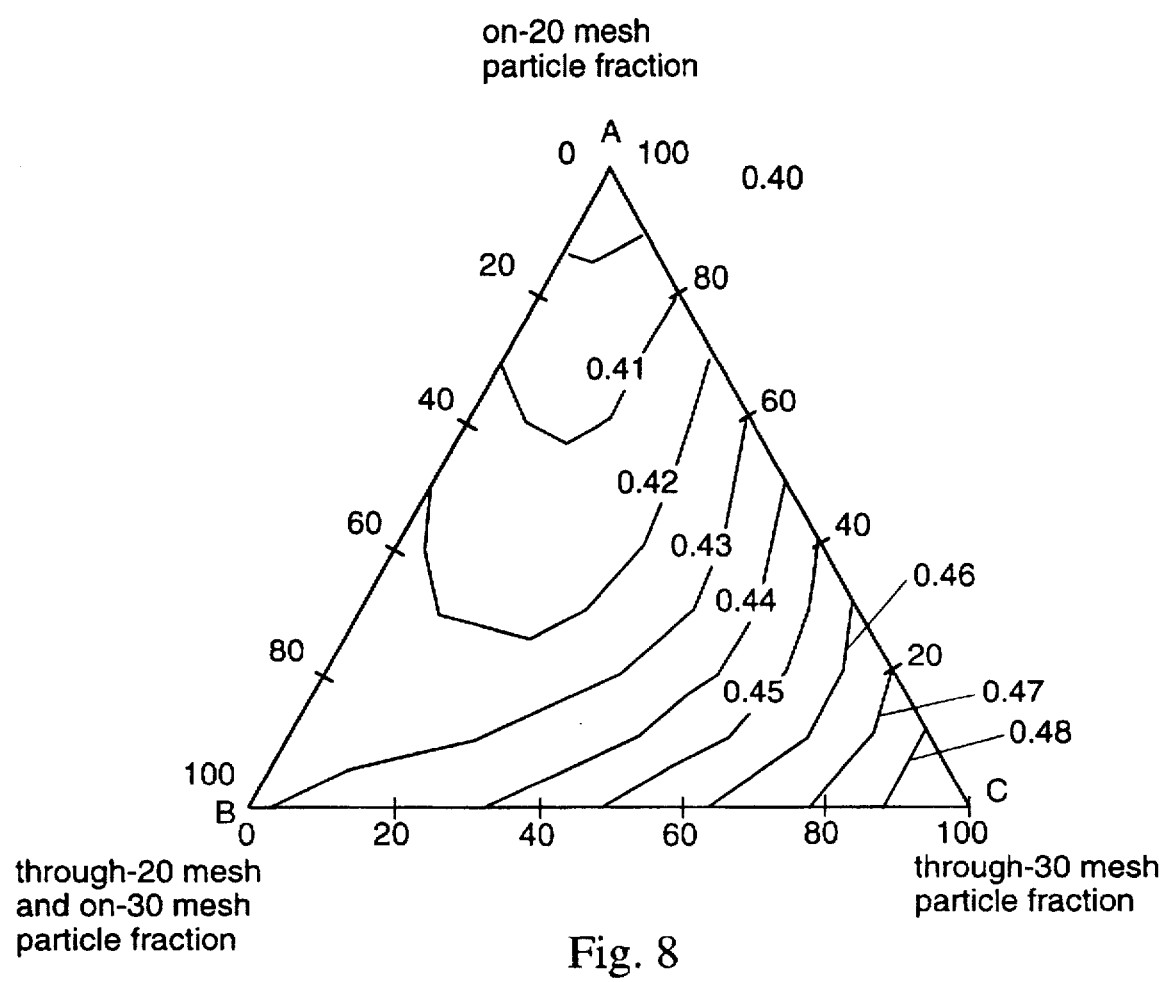

As used herein, "isobrew solid" means the brew solid contour lines on the ternary graphs in FIGS. 2 and 8 that map out regions of constant attainable brew solid values.

All ratios and percentages herein are based on weight unless otherwise specified.

Preparation of the coffee products of the present invention is described in detail as follows.

A. Isodensity and Isobrew Solid Ternary Graphs

The coffee product herein can be characterized in terms of its isodensity and isobrew solid profiles. These profiles are shown in the isodensity and isobrew solid ternary graphs set forth in FIGS. 1 and 2, respectively. All isodensity and isobrew solid ternary graphs herein were generated by the Standish and Yu regression analysis methods described hereinafter.

Isodensity ternary graphs can be generated by empirically measuring and plotting the bulk density for various multi-particle coffee mixtures. This is a highly laborious method. Consequently, mathematical methods are preferred for mapping out these ternary graphs and predicting particle packing behavior. It has been found that, for coffee particle mixtures, the preferred mathematical method is the statistical method (regression analysis) introduced by N. Standish and A. Yu, *Porosity Calculations of Ternary Mixtures of Particles*, 49 Powder Technology, 249–253 (1987), which is incorporated herein by reference. Moreover, this method requires only seven empirical measurements to generate the data points for the ternary graphs.

As shown in Table 1, bulk density values predicted via this mathematical method correlate well with measured bulk densities. Compiled in Table 1 are data taken from the isodensity ternary graphs in FIGS. 4–7. Each of the four coffee products used to generate the Table 1 data comprised a 25% coffee fine fraction and a 75% roast and ground coffee fraction. The 75% roast and ground coffee fraction also contained a conventional amount of ground fines (total fines therefore above 25%). The bulk density of the 25% coffee fine fraction, compacted or noncompacted, was different for each product. Data in Columns I–V are empirical measurements of the four coffee products. Column VI contains predicted bulk density values taken from the isodensity ternary graphs. Column V values (measured density) and corresponding Column VI values (predicted density) are within about 2% of each other.

TABLE 1

Correlation of measured bulk density to predicted bulk density generated via the Standish and Yu regression analysis method

| I<br>Measured Density of Coffee fine fraction (gm/cc)<br>*noncompacted<br>**compacted | II<br>On-20 mesh particle fraction | III<br>Through-20 and on-30 mesh particle fraction | IV<br>Through-30 mesh particle fraction | V<br>Measured density of coffee product (gm/cc) | VI<br>Predicted density of coffee product from isodensity ternary graph (gm/cc) |
|---|---|---|---|---|---|
| 0.37* | 41% | 25% | 33% | 0.39 | 0.40 |
| 0.52** | 41% | 23% | 35% | 0.42 | 0.43 |
| 0.58** | 38% | 25% | 37% | 0.43 | 0.43 |
| 0.64** | 37% | 27% | 36% | 0.44 | 0.44 |

The Standish and Yu mathematical regression method was adapted and used to generate the isodensity ternary graphs herein. Isodensity ternary graphs help define the coffee product herein. These graphs can also be used to predict the bulk density of various coffee particle mixtures, each mixture being defined by its particle size distribution. In generating the data points for these graphs, particulate coffee products are screened into three particle fractions, 1) on—20 mesh U.S. Standard Sieve Screen 2) through—20 but on—30 mesh U.S. Standard Sieve Screen, and 3) through—30 mesh U.S. Standard Sieve Screen (coffee fines). Tamped bulk density measurements are then taken by conventional techniques for each screened particle fraction, 50/50 mixtures of the fractions, and an equal mixture of all fractions.

A total of seven bulk density measurements for each coffee product are thus taken. Data points (bulk density values) defining the isodensity lines on the ternary graph are then calculated via the Standish and Yu statistical method. This method was also used to generate the isobrew solids ternary graphs in FIGS. 2 and 8.

B. Coffee Fines

The coffee product herein comprises coffee fines which have been subjected to the compaction forces described hereinafter. These fines prior to compaction can be provided by known and conventional means such as grinding, milling or flaking roasted coffee beans.

The coffee fines for use herein have average particle diameters of less than about 600 micrometers. These fine particles can also be characterized as those which can pass through a 30 mesh U.S. Standard Sieve Screen. Coffee fines suitable for use herein include coffee flakes, ground coffee, flaked coffee fines, solid coffee extracts (e.g., soluble coffee powder) and mixtures thereof derived from roasted coffee beans. Fine food particles, e.g., chicory and other coffee additives or substitutes, can also be used herein.

C. Compaction

In an essential step of the process herein, coffee fines are subjected to compaction forces which alters the particle morphology of the fines thus improving their particle packing efficiency.

Specifically, the selected coffee fines are subjected to compaction forces sufficient to increase their bulk density by at least about 0.05 gm/cc, typically by at least about 0.05 to about 0.2 gm/cc. The extent of such increases will of course depend on the bulk density of the coffee fines before compaction and the compacted target density desired. Coffee fines prior to compaction will typically have a bulk density of between about 0.30 and about 0.39 gm/cc. Accordingly, the compacted fines will have a bulk density of from about 0.40 to about 0.70 gm/cc, preferably from about 0.50 to about 0.70 gm/cc, most preferably from about 0.60 to about 0.70 gm/cc.

Suitable types of compaction forces are those which increase the bulk density of fine particles without substantially distorting the cell walls within the particles. Coffee milling and flaking operations, for example, would typically exert forces onto coffee particles that would cause substantial cell wall distortion or rupture. Such forces are not desirable for use herein.

Any compaction device can be used that can apply the requisite force to increase the bulk density and change the particle morphology as described above. Suitable devices include those which are typically used for intensive mixing. These devices provide high-shear mixing in the form of high particle-particle interactions. Examples of suitable devices include twin and single rotor mixers, e.g., Readco Mixer, manufactured by Teledyne. These mixers contain at least one rotating shaft with attached paddles inside a stationary shell. Twin rotating screws can be used within the stationary shell in place of the rotating shaft/paddles, e.g., twin screw extruders.

Compaction times will typically range from about 30 seconds to about 3 minutes, more typically from about 30 seconds to about 1 minute. Longer times can be used but are not usually necessary. Compaction times should be controlled so that excessive heat is not generated within the coffee during compaction. Compaction heat can cause off-flavor development. It can also melt coffee oils within the particles which can then result in sticky agglomerates adhering to and disrupting the processes in the compaction device. Compaction heat can be minimized by controlling compaction times and by maintaining a cool compaction environment (e.g., less than about ambient temperatures). Cool compaction temperatures can be maintained by jacketing the device in a low temperature medium or environment. Generally, temperatures of from about 10° C. to about 20° C. are used.

The coffee fines can be compacted alone or in combination with other coffee particles. The compaction operation can involve a single compaction step or a series of compaction steps. In an initial compaction step, the coffee fines are preferably compacted alone, isolated from other coffee particle types. After initial compaction, the isolated fines can be mixed with roast and ground coffee to reach a desired target density, or preferably, the mixture can be further compacted to reach the target density. Compaction times for subsequent compaction operations (e.g., after initial compaction) will be typically between 0 seconds and about 1 minute, more typically between about 20 and about 30 seconds. It is important to minimize these subsequent compaction times to minimize or avoid aroma loss of the roasted coffee that can occur during compaction. Particle mixtures subjected to subsequent compaction will typically comprise larger coffee particles (e.g., on—30 mesh screen) which are more susceptible than coffee fines to compaction-induced aroma loss. Compaction heat can easily destroy or drive-off coffee volatiles found in the larger particles within the mixture. Since coffee fines typically have little or no aroma, compacting them causes little or no aroma loss. The subsequent compaction times can be minimized or eliminated by utilizing coffee fines that have been compacted to maximum densities, e.g., 0.50 to 0.70 gm/cc. Likewise, subsequent compaction times can be minimized or eliminated by utilizing higher levels of the compacted fines in a coffee product.

Subsequent compaction of mixtures comprising compacted fines and roast and ground coffee can further improve particle packing efficiency. The morphology of the particles in such mixtures, in particular the compacted fines, can be further altered so as to pack the coffee particles even more efficiently together. Besides altering particle morphologies, the subsequent compaction operations can also act to mix and position the compacted fines between the other roast and ground coffee particles. A higher bulk density can thus be achieved and lower levels of compacted fines used to achieve target densities.

The advantages of maximizing the compacted density of the coffee fines can be appreciated by comparing the isodensity ternary graphs in FIGS. 4–7. These graphs were derived from roast and ground coffee products comprising a 25% coffee fine fraction and a 75% conventional roast and ground coffee fraction. The 75% fraction also contains a conventional amount of ground coffee fines (about 20%). The 25% coffee fine fraction in the coffee product used to generate the FIG. 4 graph was noncompacted and had a bulk density of 0.38 gm/cc. In the other coffee products, the fines had been separately compacted to a bulk density of 0.52 gm/cc (FIG. 5), 0.58 gm/cc (FIG. 6) and 0.64 gm/cc (FIG. 7), respectively, and then combined with the 75% roast and ground fraction. It can be seen from these four graphs that as the 25% coffee fine fraction is compacted and the compacted density increases, the magnitude of the isodensity lines also increases. As a result, the fraction of compacted fines needed to reach any target density can be seen to decrease as the density of the compacted coffee fines increases.

Table 2 below contains data taken from the isodensity ternary graphs in FIGS. 4–8. Table 2 also provides data for a coffee product comprising a 25% coffee fine fraction where the fines are solid coffee extract initially compacted to a density of 0.64 gm/cc.

known or conventional means to reach the desired target density. Little or no further compaction operations are necessary.

TABLE 2

Roast and Ground Coffee products

| I<br>Measured bulk density of the 25% coffee fine fraction (gm/cc) (*compacted density) | II<br>Type of coffee fines in the 25% coffee fine fraction | III<br>Predicted coffee fine fraction needed to reach 0.46 gm/cc target density | IV<br>Predicted brew solids attainable from coffee product 0.46 gm/cc density | V<br>Predicted coffee fine fraction needed to reach 0.46 gm/cc target density when coffee product is subsequently compacted for 1 minute | VI<br>Predicted brew solids attainable from coffee product at 0.46 gm/cc density when subjected to subsequent 1 minute compaction |
|---|---|---|---|---|---|
| 0.38 | ground and noncompacted | target density not reached | — | 30–50% | 0.43–0.44 |
| 0.52* | ground and compacted | target density not reached | — | 25–35% | 0.44–0.45 |
| 0.58* | ground and compacted | 59–75% | 0.44–0.45 | 20–30% | 0.43–0.44 |
| 0.64* | ground and compacted | 44–52% | 0.44–0.45 | 15–18% | 0.43–0.44 |
| 0.66* | compacted coffee extract | 49–63% | 0.73–0.82 | 10–16% | 0.52–0.56 |

It can also be seen from Table 2, Column III, that the fraction of compacted fines needed to reach a target density of, e.g., 0.46 gm/cc, decreases as the compacted density of the fines increases. It can be seen in Column V that subsequent compaction of the coffee product herein is especially useful in reducing the level of compacted fines needed to reach target density. For example, to reach a 0.46 gm/cc target density with compacted fines having a 0.64 gm/cc density, the coffee product must contain from 44–52% of the compacted fines. By subsequently compacting the coffee product for about 1 minute, the level of compacted fines needed to reach a 0.46 gm/cc target density is reduced to 15–18%. Subsequent compaction is even more useful when the compacted fines comprise solid coffee extracts. For example, to reach a 0.46 gm/cc target density with coffee extract compacted to 0.66 gm/cc, the coffee product must contain from 49% to 63% of the compacted extract. By subsequently compacting the coffee product made with the compacted fines for about 1 minute, the level of compacted extract needed to reach 0.46 gm/cc target density is reduced to 10–16%.

Preferably, the coffee products herein contain the minimum level of compacted fines needed to reach target density. Minimizing the level of compacted fines improves the products appearance and flowability, e.g., it appears and flows more like conventional roast and ground coffee. Minimizing such levels can consequently also increase the level of non-compacted or larger on—30 mesh coffee particles in the product. The non-compacted or larger coffee particles tend to provide more aroma to the coffee product.

D. Coffee Product

Figure 1:
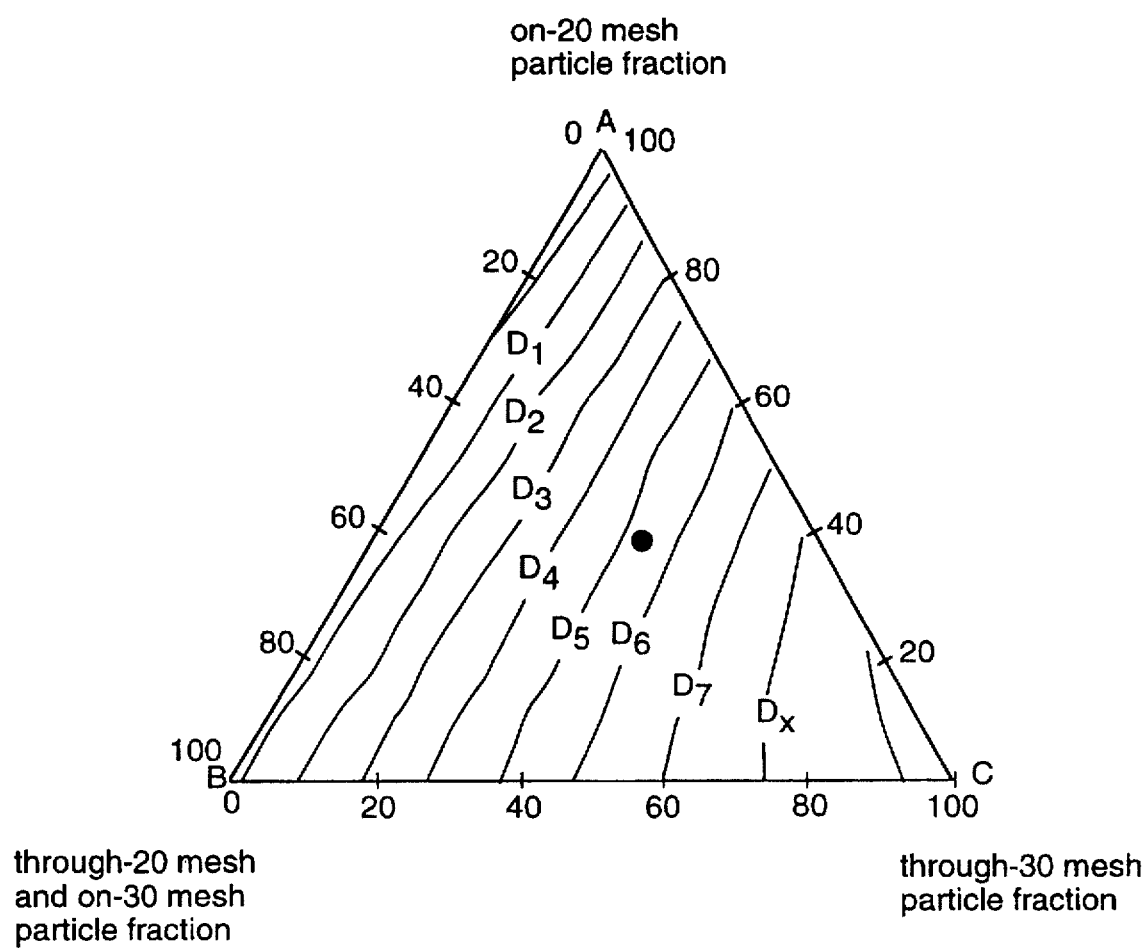

The coffee product of the present invention comprises the compacted fines described herein and exhibits the isodensity and isobrew solid profiles set forth in FIGS. 1 and 2, respectively.

The coffee product preferably further comprises other coffee particle types such as roast and ground coffee, flaked coffee, flaked coffee fines, agglomerated coffee, solid coffee extract, and mixtures thereof. The other coffee particle types can be compacted or noncompacted. The compacted fines and optional other coffee types can be mixed together by An important aspect of this invention is that the bulk density of particulate coffee products can now be controlled or increased by using these compacted fines in such products. A target bulk density can be controlled by regulating the amount and density of fines, compacted or otherwise, added to the coffee product. Thus, by controlling the amount and density of fines in this manner, a target bulk density can be reached without relying exclusively upon green bean roasting for controlling bulk density.

Preferably, the compacted fines and roast and ground coffee, more preferably the noncompacted roast and ground coffee and the compacted fines, comprises from about 1% to about 99%, more preferably from about 15% to about 60%, and most preferably from about 20% to about 40% of compacted fines, and from about 1% to about 99%, more preferably from about 40% to about 85%, most preferably from about 60% to about 80% of roast and ground coffee. Mixtures comprising the noncompacted roast and ground coffee exhibit more intense canister headspace aromas as measured by conventional gas chromatographic techniques.

The compacted fines herein can also be utilized in the compaction process described in U.S. Pat. No. 5,227,188. The patented process involves the same or similar compaction devices as described herein. In utilizing this patented process, the compacted fines are combined in critical weight ratios with roast and ground coffee and then densified in accordance with the patented process.

The compacted fines in the coffee product herein exhibit improved particle packing characteristics. That is, the compacted fines fit more efficiently among themselves and other particle types while maintaining particle flowability. It is believed that the compaction described herein affects particle morphology, possibly by rounding off sharp particle protrusions. The fine rounded particles fit more efficiently together. When larger coffee particles are subjected to compaction forces, they exhibit similar morphological changes, i.e., rounding. However, unlike the morphological changes to the fines, the changes to the larger particles have surprisingly little effect on bulk density. It is important to note that it is the altered particle morphology, not the mere compaction of fine coffee particles, that provides the improved particle packing characteristics. Light mixing of the compacted fines to introduce spaces between the compacted fines will not reduce their particle packing characteristics, i.e., the particles still exhibit the same improved particle packing characteristics.

Another surprising aspect of the coffee product herein is the relationship between its bulk density and compacted coffee fine fraction. It is well known that as coffee fine fractions in roast and ground coffee increase, the bulk density of the coffee will decrease. It is well known that ground coffee fines are light powders that only decrease bulk densities. By contrast, as the compacted coffee fine fraction increases in the coffee product herein, the bulk density will actually increase.

Yet another surprising aspect of the coffee product herein is the relationship between its bulk density, fraction of compacted fines, and brew yields. It is well known that brew yields increase as coffee fine fractions increase and the bulk density decreases. Coffee fines typically provide increased brew solids (and therefore brew yields) while also contributing to a reduced bulk density. The compacted fines of the present invention, however, provide increased brew solids while also increasing bulk density. In so doing, roast and ground coffee products can now be made which have an exceptionally high bulk density and brew yield.

For purposes of defining the coffee product herein, a defining characteristic in the FIG. 1 isodensity ternary graph is the relationship between bulk density and the fraction of coffee fines in the coffee products. As the fraction of coffee fines increases, the bulk density also increases. In FIG. 1, the bulk density increases from isodensity lines D1 to Dx, where x is the number of isodensity lines. The fraction of coffee fines in the coffee product also increases from isodensity lines D1 to Dx. The exact number and position of these isodensity lines is not critical in defining the coffee product herein.

Figure 3:
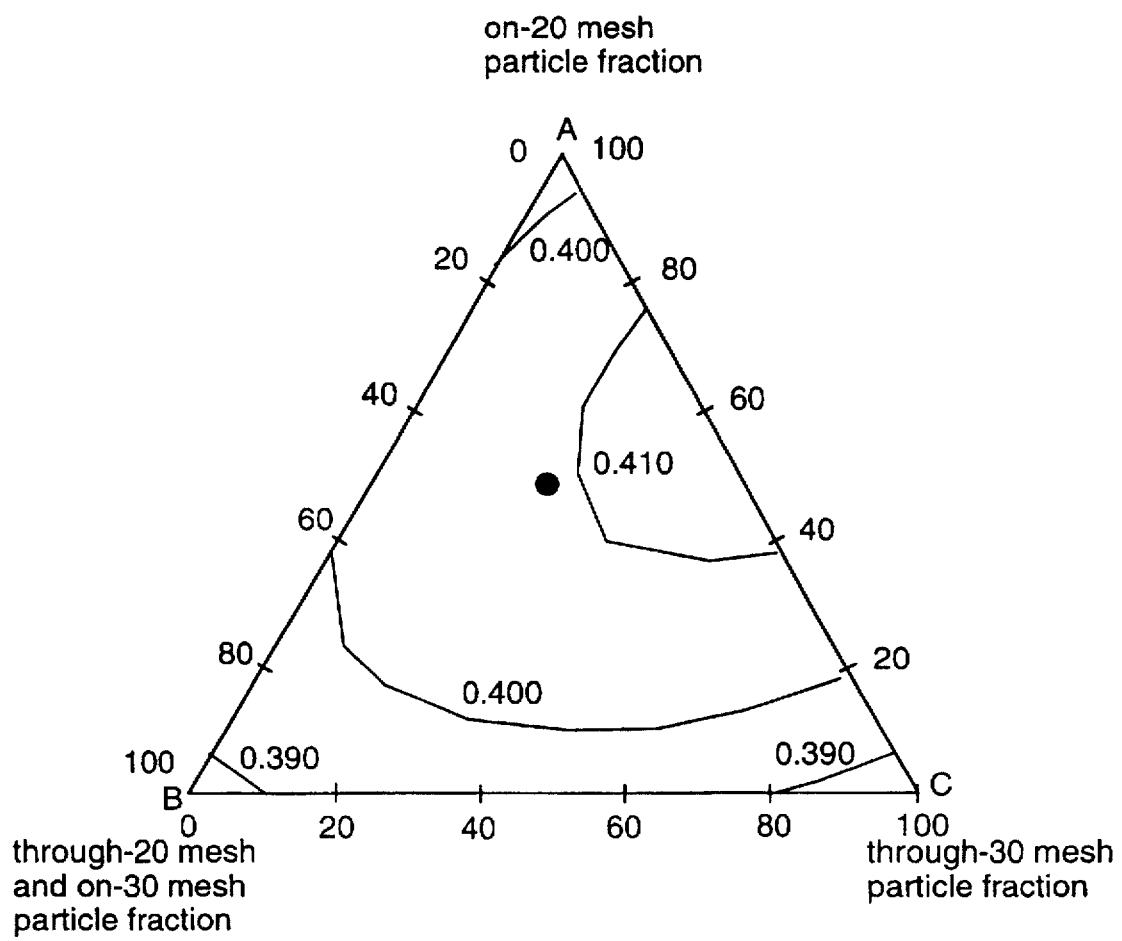
FIG. 3 is an isodensity ternary graph for a conventional 13 ounce roast and ground coffee.
Figure 4:
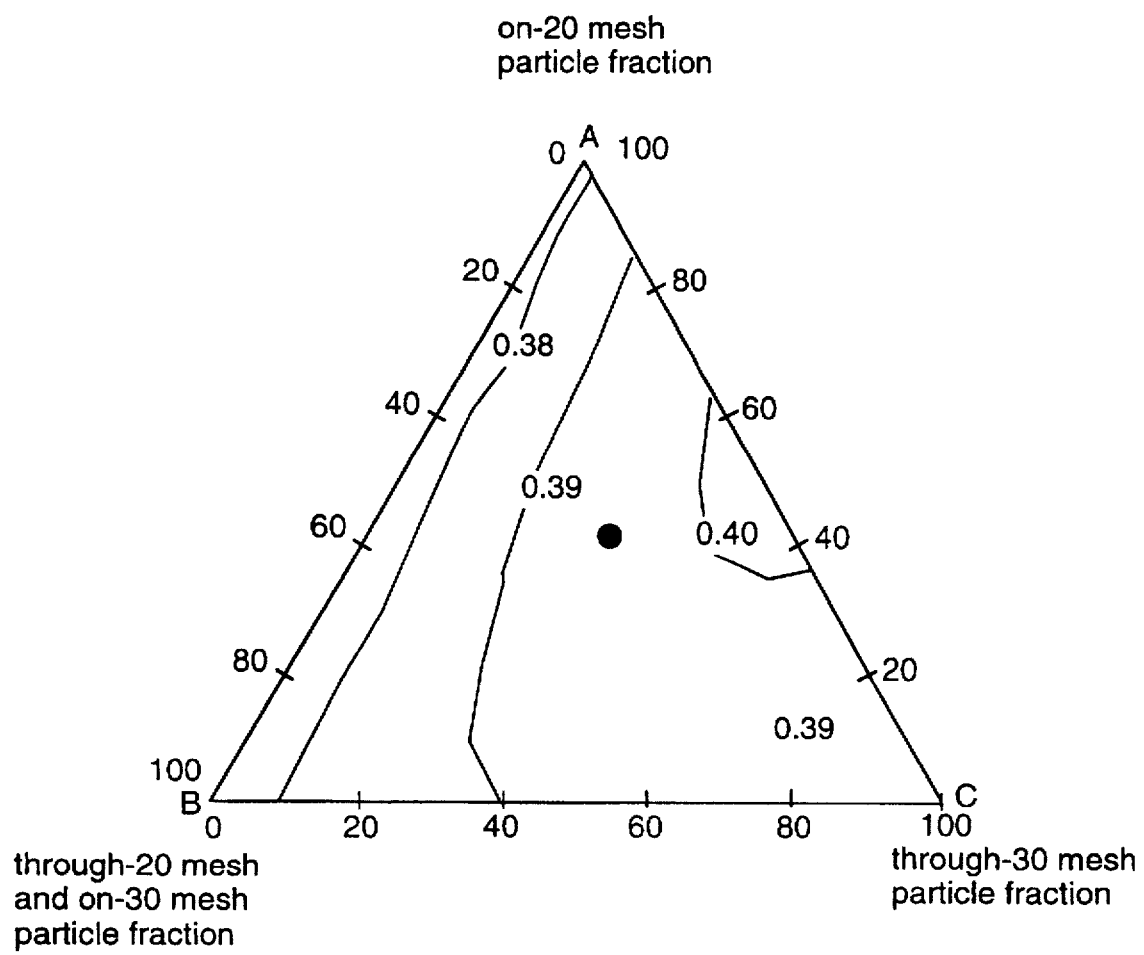
FIG. 4 is an isodensity ternary graph for a coffee product comprising a mixture of 25% noncompacted fines and 75% roast and ground coffee. The 25% fines in the mixture have a bulk density of 0.38 gm/cc.
Figure 5:
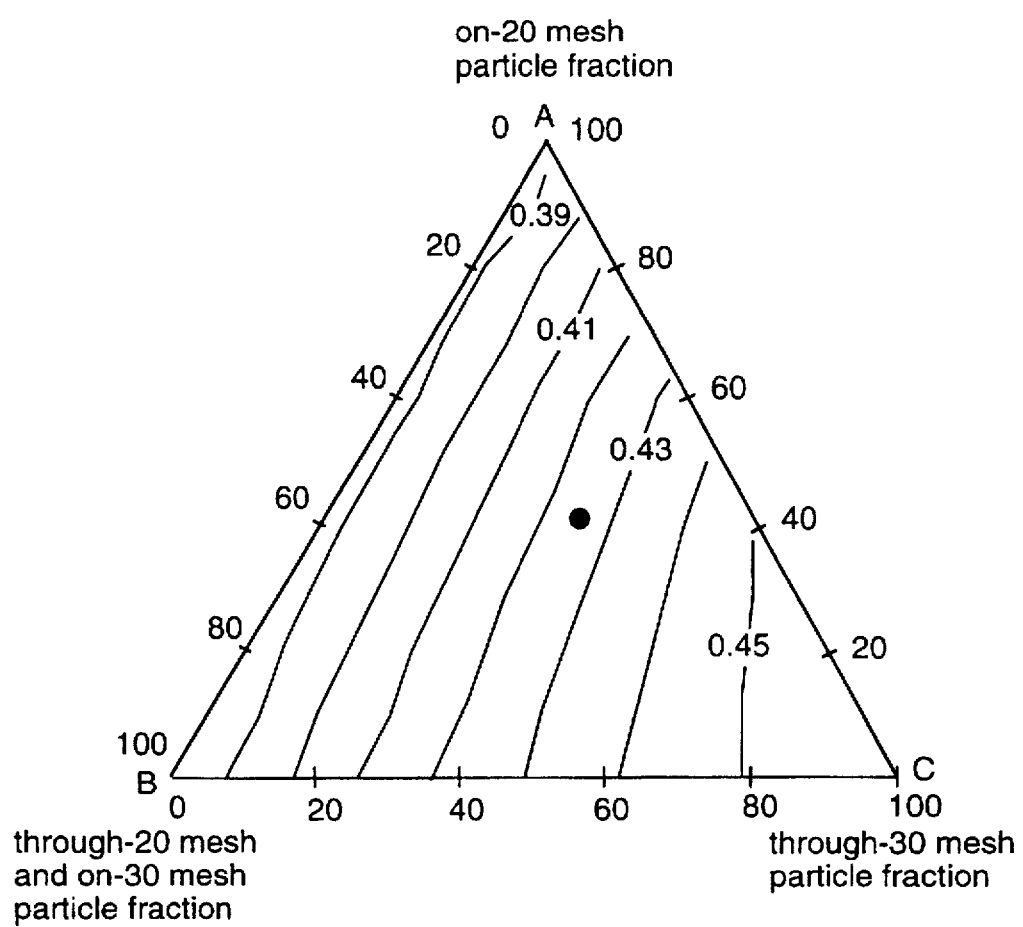
FIG. 5 is an isodensity ternary graph for a coffee product comprising a mixture of 25% compacted fines and 75% roast and ground coffee. The 25% fines were compacted separately and have a compacted density of about 0.52 gm/cc.
Figure 6:
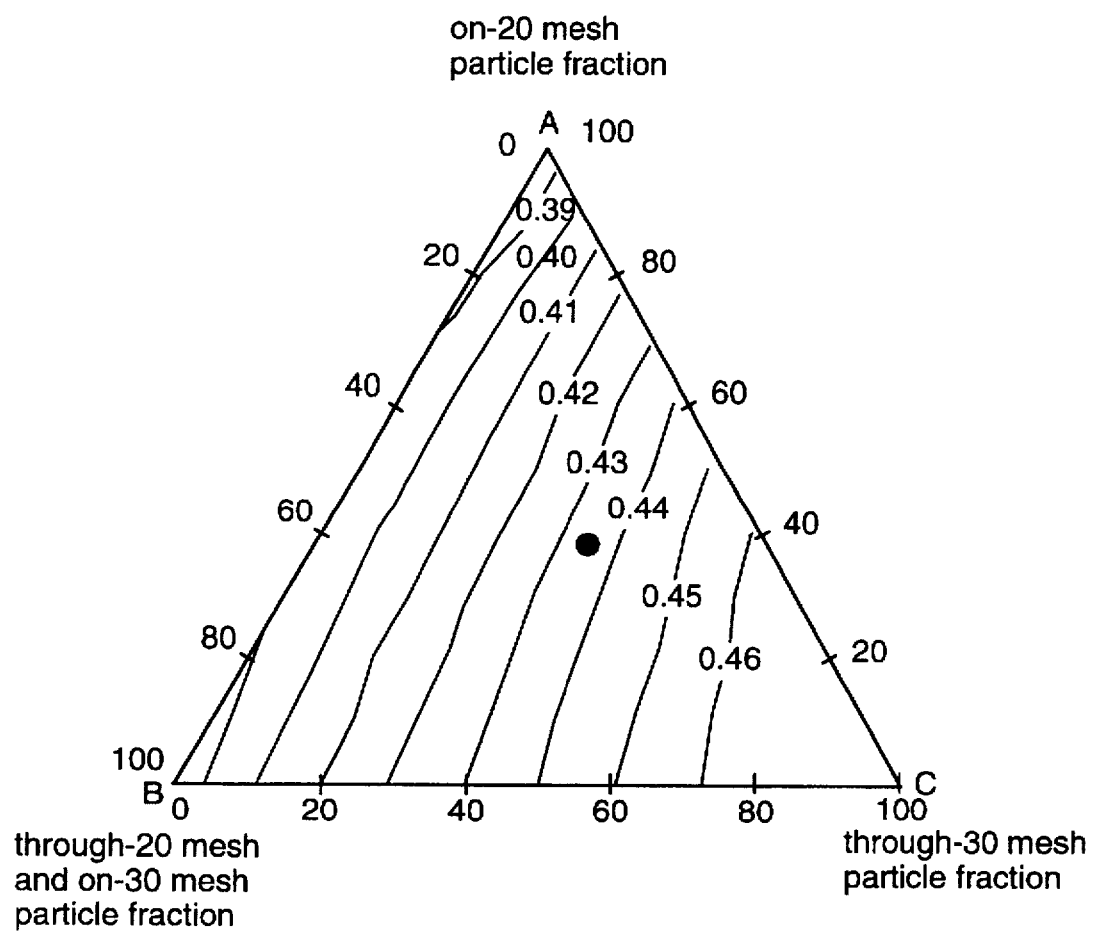
FIG. 6 is an isodensity ternary graph for a coffee product comprising a mixture of 25% compacted fines and 75% roast and ground coffee. The 25% fines were compacted separately and have a compacted density of 0.58 gm/cc.
Figure 7:
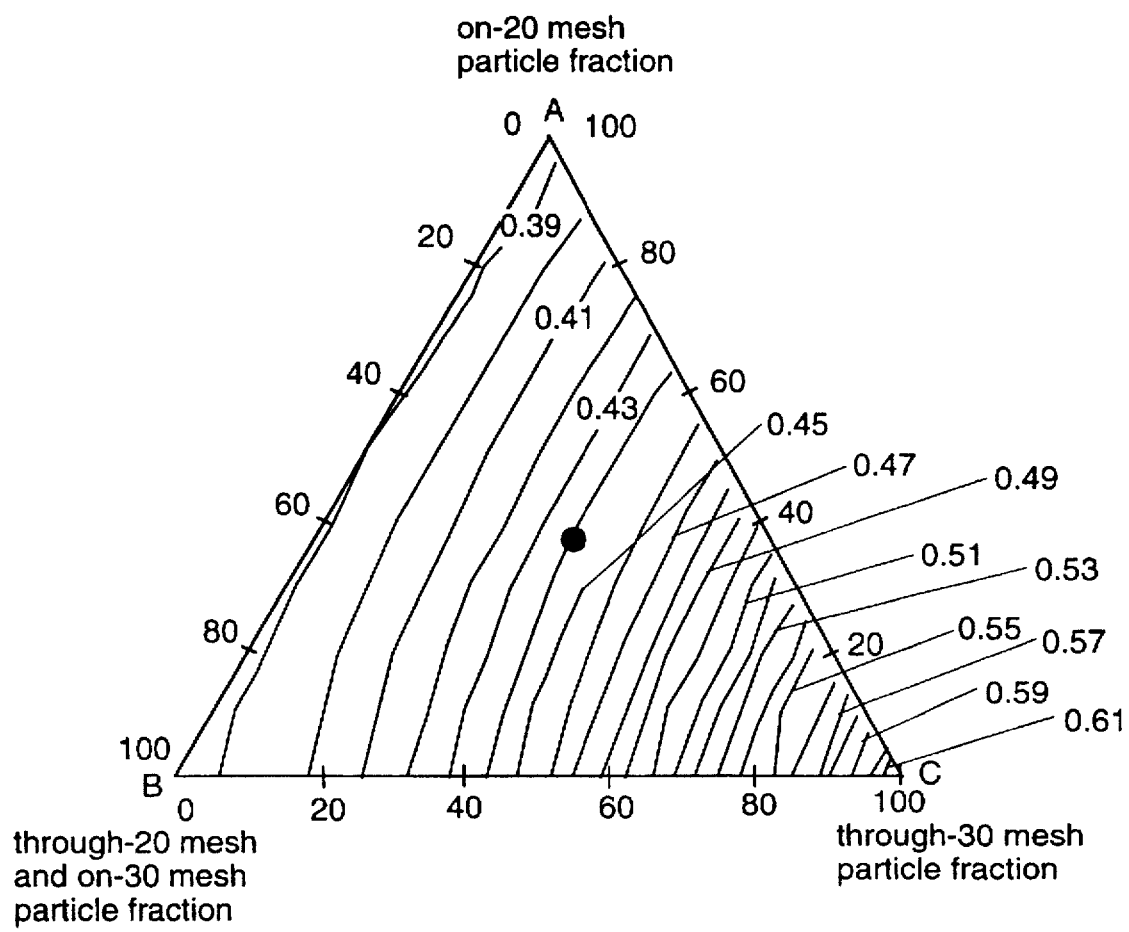
FIG. 7 is an isodensity ternary graph for a coffee product of the present invention comprising a mixture of 25% compacted fines and 75% roast and ground coffee. The 25% fines were compacted separately and have a compacted density of 0.64 gm/cc.

The isodensity profile of the coffee product herein is remarkably different than the isodensity profiles of conventional roast and ground coffee. FIG. 3 shows the isodensity profile of a commercially available 13 ounce roast and ground coffee. By contrast, FIG. 7 shows the isodensity profile of a coffee product of the present invention which comprises about 25% compacted fines (compacted density 0.64 gm/cc) and about 75% noncompacted roast and ground coffee. It can be seen from the FIG. 7 ternary graph that the bulk density of the coffee product herein will increase with increased fractions of compacted fines. By contrast, bulk density values on the FIG. 3 graph (conventional 13 ounce coffee) do not necessarily increase with increased coffee fine fractions.

For purposes of defining the coffee product herein, a defining characteristic in the FIG. 2 brew solid ternary graph is the relationship between brew solids and coffee fine fractions. As the fraction of compacted fines increases, the attainable brew solids and the bulk density also increase. In FIG. 2, attainable brew solids increase from isobrew solid lines B1 to Bx where x is the number of isobrew solid lines. The exact number and position of these isobrew solid lines is not critical in defining the coffee product herein. Unlike conventional roast and ground coffee products, the coffee product herein exhibits increased attainable brew solids with an increased bulk density and increased coffee fine fractions.

EXAMPLES

Preparation of the coffee products of the present invention is illustrated by the following examples.

Example 1

A first batch of roasted coffee beans are ground in a Gump grinder so that about 55% of the coffee can pass through a 20-mesh U.S. Standard Sieve Screen (typically described as regular grind). The bulk density of the ground coffee is about 0.38 gm/cc. A second batch of roasted coffee beans are finely ground in a Gump grinder so that about 98% of the coffee can pass through a 30-mesh U.S. Standard Sieve Screen (typically described as fine grind). The bulk density of the finely ground coffee is about 0.35 gm/cc.

The finely ground coffee is subjected to compaction forces in a Brabender farinograph which has a Sigma blade mixing device. The farinograph is an analytical device typically used in dough development to measure work input and blade rotation. After compaction the fines have a bulk density of 0.64 gm/cc. The compacted fines and the non-compacted coffee (from the first batch) are mixed together in a 1:3 ratio of fines to non-compacted coffee. Without further compaction, the mixture has a bulk density of about 0.44 gm/cc. Isodensity and isobrew solid ternary graphs are generated from the mixture via the Standish and Yu regression analysis method. To obtain the seven empirical measurements required by this method, bulk density values are measured by conventional methods as tamped bulk density. Brew solids are measured from 10 cups of coffee brewed from 19.2 gm of the coffee mixture on an automatic drip coffee maker.

The resulting isodensity and isobrew solid ternary graphs are shown in FIGS. 7 and 8, respectively.

Example 2

A coffee product with a target density of about 0.44 gm/cc is generated as in Example 1. It is then subjected to compaction forces (also as described in Example 1) for about 1 minute. The resulting compacted coffee product has a bulk density of about 0.49 gm/cc.

Example 3

A coffee product is generated as in Example 2 except that the compacted fines are compacted solid coffee extract rather than ground coffee fines. The resulting compacted coffee product has a bulk density of about 0.56 gm/cc.

Example 4

The following operations were performed to show that compacted coffee fines in a particle mixture control bulk density. Conversely, the following operations also show that other coffee particles (on—30 mesh particles) subjected to compaction forces have surprisingly little effect on bulk density.

Figure 9:
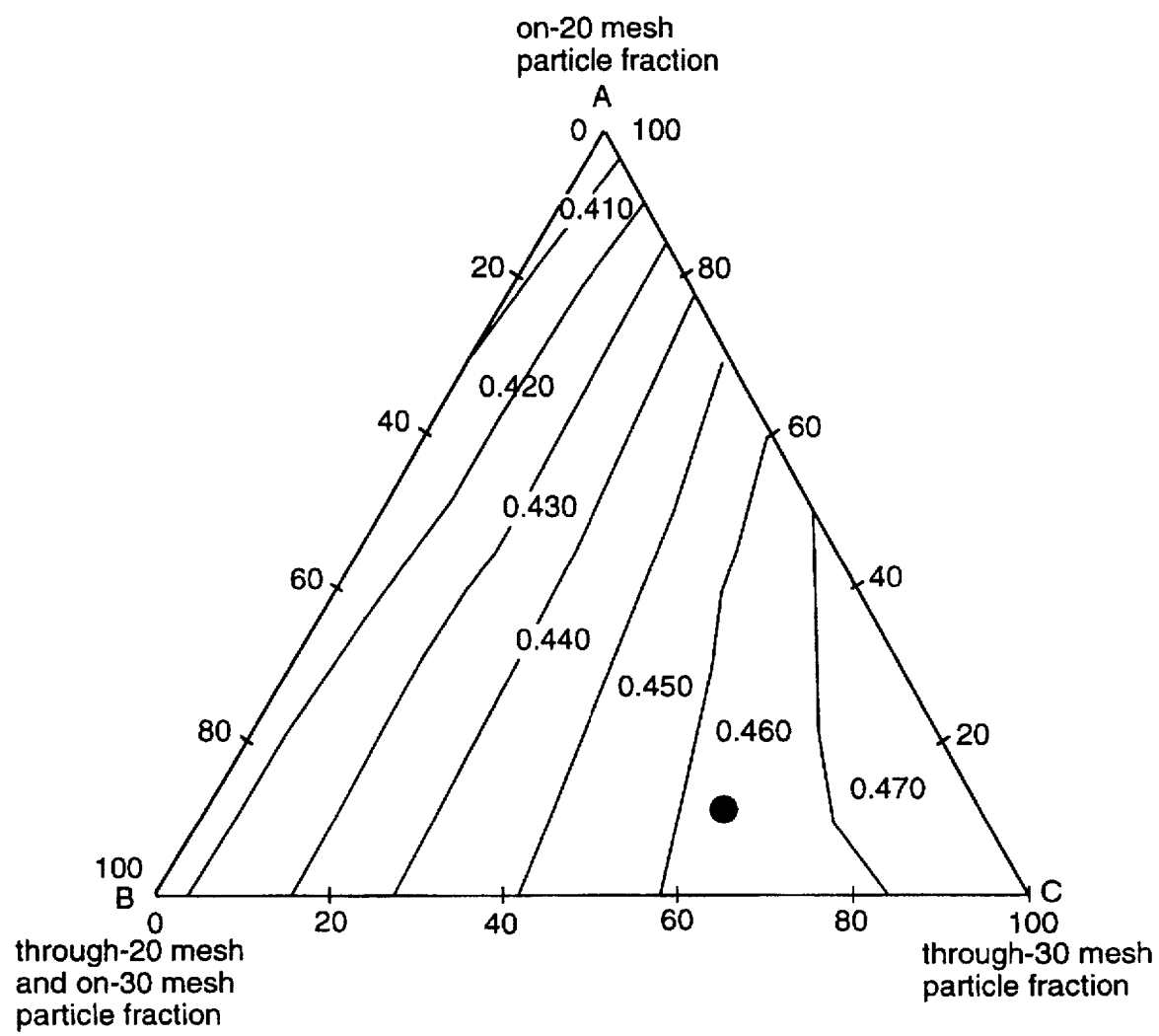
FIG. 9 is an isodensity ternary graph for a mixture of 25% fines and 75% roast and ground coffee. The mixture has been compacted to a density of 0.46 gm/cc.

(a) Two coffee particle fractions, 25% coffee fines and 75% roast and ground coffee (55% through—20 mesh U.S. Standard Screen) are mixed together by conventional means. Without compaction, the mixture has a bulk density of about 0.39 gm/cc. The mixture is then compacted to a bulk density of 0.46 gm/cc. Compaction devices and process parameters are the same as those described in Example 1. An isodensity ternary graph is generated from this compacted product. The graph is shown in FIG. 9. The isodensity profile therein is such that bulk density values increase as coffee fine fractions increase.

Figure 10:
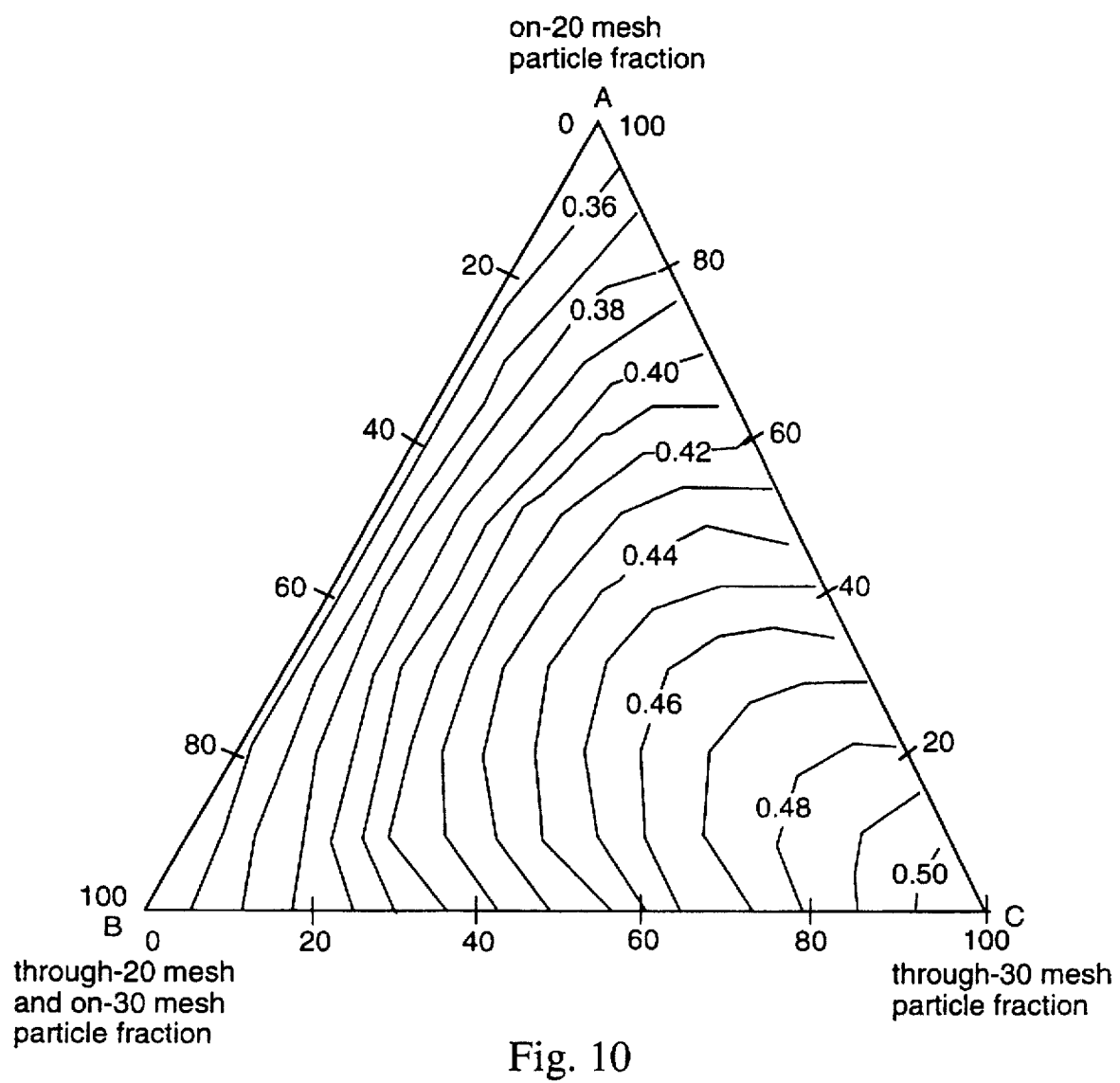
FIG. 10 is an isodensity ternary graph for the coffee product used to generate the FIG. 9 graph but with the compacted on—30 mesh particle fraction replaced with similar sized noncompacted particles.

(b) A second isodensity ternary graph is generated whereby the on—30 mesh U.S. Standard Sieve Screen particle fraction in the compacted mixture is replaced by non-compacted on—30 mesh coffee particles. The graph is shown in FIG. 10. The isodensity profile remains unchanged from that in FIG. 9 to the extent that bulk density values still increase with increased coffee fine fractions.

Figure 11:
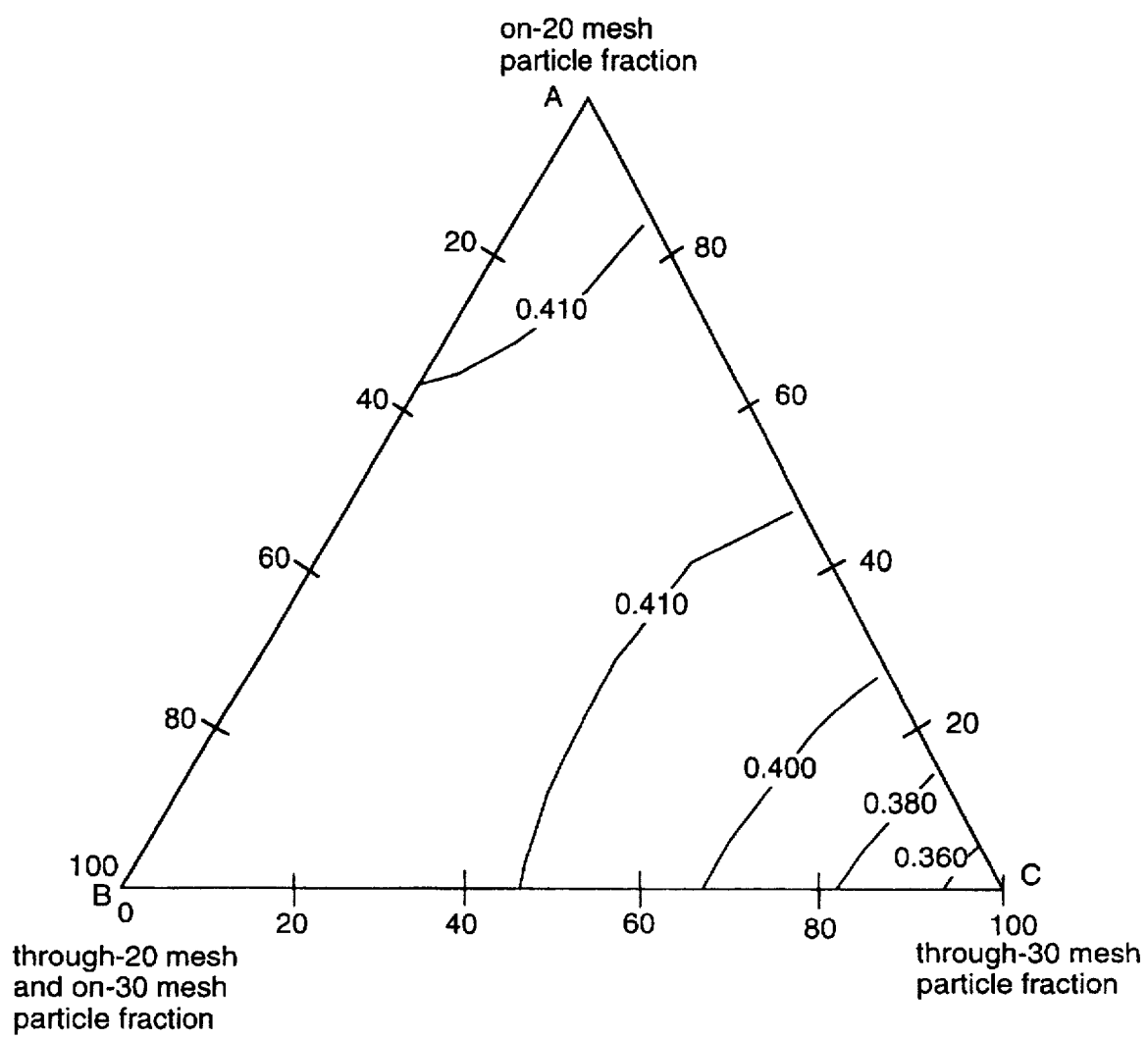
FIG. 11 an isodensity ternary graph for the coffee product used to generate the FIG. 9 graph but with the compacted fine fraction replaced by noncompacted fines.

(c) A third isodensity ternary graph is generated whereby the coffee fines are replaced by non-compacted fines. The graph is shown in FIG. 11. By eliminating the compacted fines, the isodensity profile has changed substantially. Bulk density values no longer increase necessarily with increased coffee fine fractions. The isodensity profile is changed as such from that in (a) even though it still contains compacted on—30 mesh particles. Accordingly, the presence of compacted on—30 mesh particles had little effect on bulk density. Rather, it is the presence of compacted through—30 mesh particles (coffee fines) that controls bulk density.

What is claimed is:

1. Particulate roast and ground coffee products with improved particle packing characteristics, which products comprise from about 40% to about 85% noncompacted roast and ground coffee particles having average particle diameters greater than about 600 micrometers, and from about 15% to about 60% compacted roast and ground coffee particles which consist essentially of fine roast and ground coffee particles having a compacted bulk density of from about 0.40 to about 0.70 gm/cc and average particle diameters of less than about 600 micrometers, wherein the coffee products have an isodensity profile as set forth in the FIG. 1 isodensity ternary graph, where bulk density values for any ternary mixture of particles as represented on the graph increase with increased fractions of fine roast and ground coffee particles in said coffee products, and wherein the coffee products have an isobrew solid profile as set forth in the FIG. 2 isobrew solid ternary graph, where brew solid values for any ternary mixture of particles as represented on the graph increase with increased fractions of fine roast and ground coffee particles in said coffee products.

2. The coffee products according to claim 1 wherein said coffee products comprise from about 20% to about 40% by weight of the compacted roast and ground coffee particles and from about 60% to about 80% of the noncompacted roast and ground coffee.

3. The coffee products according to claim 1 wherein the compacted bulk density of the compacted roast and ground coffee particles is from about 0.50 to about 0.70 gm/cc.

4. A process for making particulate roast and ground coffee products with improved particle packing characteristics, which process comprises a) obtaining fine roast and ground coffee particles having average particle diameters of less than about 600 micrometers; and b) compacting the fine roast and ground coffee particles to a bulk density of from about 0.40 to about 0.70 gm/cc to provided compacted fine coffee particles;

c) combining from about 15% to about 60% of the compacted fine roast and ground coffee particles with from about 40% to about 85% noncompacted roast and ground coffee particles having average particle diameters greater than about 600 micrometers wherein the coffee products have an isodensity profile as set forth in the FIG. 1 isodensity ternary graph, where bulk density values for any ternary mixture of particles as represented on the graph increase with increased fractions of compacted fine roast and ground coffee particles in said coffee products, and wherein the coffee products have an isobrew solid profile as set forth in the FIG. 2 isobrew solid ternary graph, where brew solid values for any ternary mixture of particles as represented on the graph increase with increased fractions of compacted fine roast and ground coffee particles in said coffee products.

5. The process of claim 4 wherein the coffee products comprise from about 20% to about 40% of the compacted fine roast and ground coffee particles and from about 60% to about 80% of the roast and ground coffee.

6. The process of claim 4 wherein the compacted bulk density of the compacted fine roast and ground coffee particles is from about 0.50 to about 0.70 gm/cc.

7. A process for making particulate roast and ground coffee products with improved particle packing characteristics, which process comprises a) obtaining fine roast and ground coffee particles having average particle diameters of less than about 600 micrometers; and b) compacting the fine coffee particles to a bulk density of from about 0.40 to about 0.70 gm/cc to provided compacted fine roast and ground coffee particles;

c) mixing the compacted fine roast and ground coffee particles with noncompacted roast and ground coffee, wherein said mixture comprises from about 15% to about 60% compacted fine roast and ground coffee particles and from about 40% to about 85% noncompacted roast and ground coffee having average particle diameters greater than about 600 micrometers;

wherein the coffee products have an isodensity profile as set forth in the FIG. 1 isodensity ternary graph, where bulk density values for any ternary mixture of particles as represented on the graph increase with increased fractions of fine coffee particles in said coffee products, and wherein the coffee products have an isobrew solid profile as set forth in the FIG. 2 isobrew solid ternary graph, where brew solid values for any ternary mixture of particles as represented on the graph increase with increased fractions of fine roast and ground coffee particles in said coffee products.

8. The process of claim 7 wherein the mixture comprises from about 20% to about 40% compacted fine roast and ground coffee particles and from about 60% to about 80% roast and ground coffee.

9. The process of claim 7 wherein the fine roast and ground coffee particles are compacted in step (b) to a bulk density of from about 0.50 to about 0.70 gm/cc.

10. The process of claim 6 wherein the compacted bulk density of the fine roast and ground coffee particles is from about 0.60 to about 0.70 gm/cc.

11. The process of claim 9 wherein the fine roast and ground coffee particles are compacted in step (b) to a bulk density of from about 0.60 to about 0.70 gm/cc.

12. Particulate roast and ground coffee products with improved particle packing characteristics, which products comprise from about 40% to about 85% noncompacted roast and ground coffee particles having average particle diameters greater than about 600 micrometers, and from about 15% to about 60% compacted roast and ground coffee particles which consist essentially of fine roast and ground coffee particles having a compacted bulk density of from about 0.60 to about 0.70 gm/cc and average particle diameters of less than about 600 micrometers, wherein the coffee products have an isodensity profile as set forth in the FIG. 1 isodensity ternary graph, where bulk density values for any ternary mixture of particles as represented on the graph increase with increased fractions of fine roast and ground coffee particles in said coffee products, and wherein the coffee products have an isobrew solid profile as set forth in the FIG. 2 isobrew solid ternary graph, where brew solid values for any ternary mixture of particles as represented on the graph increase with increased fractions of fine roast and ground coffee particles in said coffee products.

* * * * *